US012533892B2

(12) United States Patent
Maezawa

(10) Patent No.: US 12,533,892 B2
(45) Date of Patent: Jan. 27, 2026

(54) IMAGE FORMING APPARATUS AND HEATING CONTROL METHOD CAPABLE OF SUPPRESSING IMAGE DISTORTION

(71) Applicant: KYOCERA Document Solutions Inc., Osaka (JP)

(72) Inventor: Nobuhiro Maezawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 148 days.

(21) Appl. No.: 18/514,298

(22) Filed: Nov. 20, 2023

(65) Prior Publication Data

US 2024/0165970 A1 May 23, 2024

(30) Foreign Application Priority Data

Nov. 21, 2022 (JP) ................................ 2022-185447

(51) Int. Cl.
*B41J 11/00* (2006.01)
*B41J 15/04* (2006.01)
(Continued)

(52) U.S. Cl.
CPC ...... *B41J 11/00242* (2021.01); *B41J 11/0005* (2013.01); *B41J 11/002* (2013.01); *B41J 11/0024* (2021.01); *B41J 11/00244* (2021.01); *B41J 11/003* (2013.01); *B41J 11/005* (2013.01); *B41J 15/04* (2013.01); *B41M 5/0047* (2013.01); *B41M 5/0064* (2013.01);
(Continued)

(58) Field of Classification Search
CPC . B41J 11/00242; B41J 11/0005; B41J 11/002; B41J 11/0024; B41J 11/00244; B41J 11/003; B41J 11/005; B41J 15/04; B41J 2/04515; B41J 11/0025; B41J 2002/14177; B41M 5/0047; B41M 5/0064
See application file for complete search history.

(56) References Cited

U.S. PATENT DOCUMENTS 5,355,204 A * 10/1994 Aoki .................... G03G 15/206
399/329
5,728,252 A * 3/1998 Kniazzeh .............. F16C 13/024
156/324

(Continued)

FOREIGN PATENT DOCUMENTS

JP 2019116029 A 7/2019

*Primary Examiner* — Henok D Legesse
(74) *Attorney, Agent, or Firm* — Alleman Hall & Tuttle LLP

(57) ABSTRACT

The image forming apparatus includes an ejection portion, a guide portion, a plurality of heating elements, a determination processing portion, and a drive control portion. The ejection portion ejects ink toward a first surface of a strip-shaped medium. The guide portion is provided at a position sandwiching the medium between the guide portion and the ejection portion, and forms a guide surface that guides the medium by coming into contact with a second surface on a rear side of the first surface of the medium. The plurality of heating elements are arranged along a width direction of the medium below the guide surface. The determination processing portion determines the heating elements to be driven based on the width of the medium. The drive control portion drives the heating elements determined by the determination processing portion as heating elements to be driven.

8 Claims, 8 Drawing Sheets

(51) Int. Cl.
*B41M 5/00* (2006.01)
*B41J 2/045* (2006.01)
*B41J 2/14* (2006.01)

(52) U.S. Cl.
CPC .. *B41J 2/04515* (2013.01); *B41J 2002/14177* (2013.01); *B41J 11/0025* (2013.01)

(56) References Cited

U.S. PATENT DOCUMENTS

| | | | | |
|---|---|---|---|---|
| 2014/0009546 | A1* | 1/2014 | Velasco | B41J 29/377<br>347/102 |
| 2019/0193392 | A1* | 6/2019 | Miyata | B41J 2/14088 |
| 2020/0089148 | A1* | 3/2020 | Kondo | G03G 15/607 |

* cited by examiner

IMAGE FORMING APPARATUS AND HEATING CONTROL METHOD CAPABLE OF SUPPRESSING IMAGE DISTORTION

INCORPORATION BY REFERENCE

This application is based upon and claims the benefit of priority from the corresponding Japanese Patent Application No. 2022-185447 filed on Nov. 21, 2022, the entire contents of which are incorporated herein by reference.

BACKGROUND

The present disclosure relates to an inkjet image forming apparatus and a heating control method.

In an image forming apparatus that ejects ink onto a strip-shaped medium such as a plastic film, the medium is heated in order to dry the ink that has been ejected onto the medium. For example, the image forming apparatus includes a guide portion that forms a guide surface that guides the medium by coming in contact with a back surface of the medium, and a plurality of heating elements arranged along a width direction of the medium below the guide surface. In addition, an image forming apparatus that, of the plurality of the heating elements, selectively drives the heating elements facing an ink adhesion area of the medium is known as related technology.

SUMMARY

An image forming apparatus according to an aspect of the present disclosure includes a take-up portion, an ejection portion, a guide portion, a plurality of heating elements, a determination processing portion, and a drive control portion. The take-up portion takes up a strip-shaped medium. The ejection portion ejects ink toward a first surface of the medium pulled out from a supply source of the medium by the take-up portion. The guide portion is provided at a position sandwiching the medium between the guide portion and the ejection portion, and forms a guide surface that guides the medium by coming into contact with a second surface on the rear side of the first surface of the medium. The plurality of heating elements are arranged along a width direction of the medium below the guide surface. The determination processing portion determines the heating elements to be driven based on the width of the medium. The drive control portion drives the heating elements determined by the determination processing portion as heating elements to be driven.

A heating control method according to another aspect of the present disclosure is executed by an image forming apparatus including: a take-up portion configured to take up a strip-shaped medium; an ejection portion configured to eject ink toward a first surface of the medium pulled out from a supply source of the medium by the take-up portion; a guide portion provided at a position sandwiching the medium between the guide portion and the ejection portion, the guide portion configured to form a guide surface that guides the medium by coming into contact with a second surface of the medium on a rear side of the first surface; and a plurality of heating elements arranged along a width direction of the medium below the guide surface; the heating control method including a determination step and a drive control step. In the determination step, the heating elements to be driven are determined based on a width of the medium.

In the drive control step, the heating elements determined by the determination step as heating elements to be driven are driven.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments according to the present disclosure will be described below with reference to the accompanying drawings. Note that the following embodiments are examples of embodying the technology according to the present disclosure, and do not limit the technical scope as described in the present disclosure.

[Configuration of the Image Forming Apparatus 100]

Figure 1:
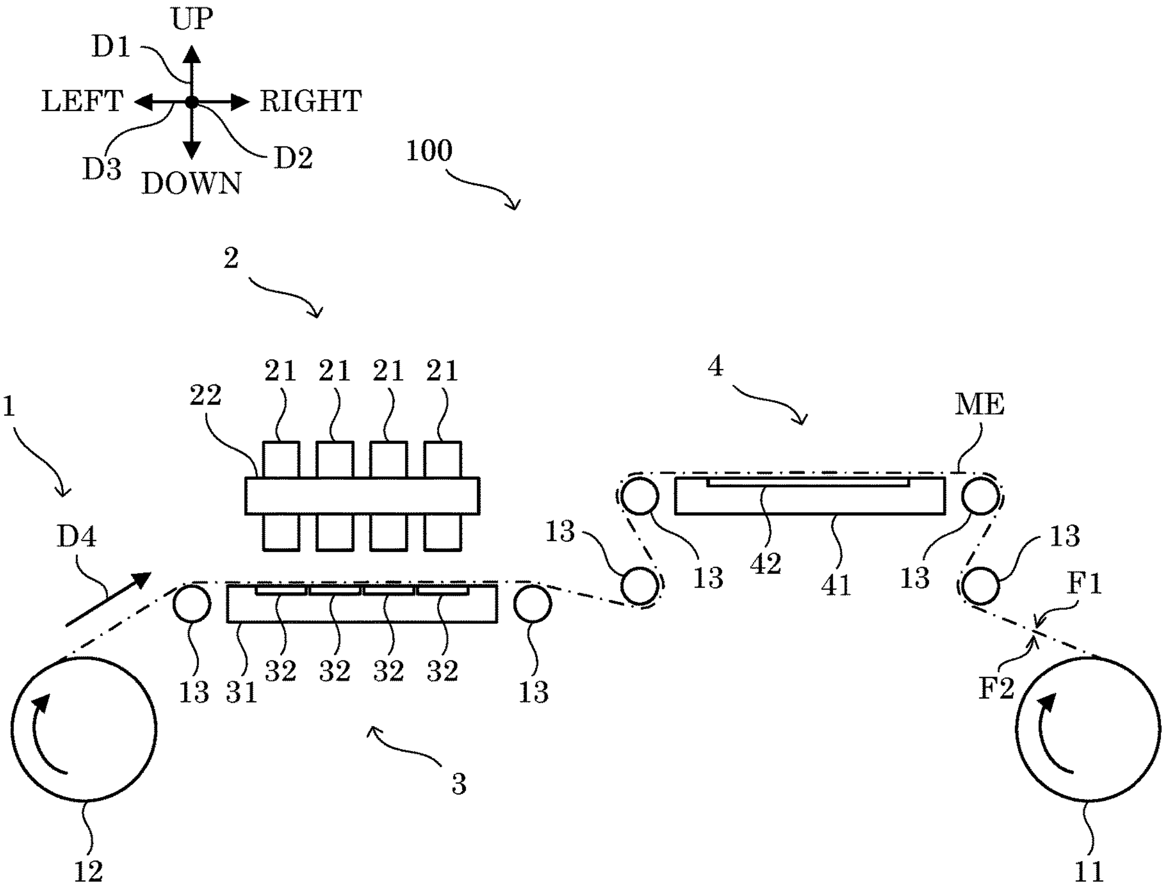
FIG. 1 is a diagram showing a configuration of an image forming apparatus of an embodiment according to the present disclosure.

First, a configuration of an image forming apparatus 100 of an embodiment according to the present disclosure will be described with reference to FIG. 1 to FIG. 3. Here, FIG. 1 is a cross-sectional view showing the configuration of the image forming apparatus 100. In addition, FIG. 3 is a view of an image forming portion 2 as seen from above the image forming portion 2. Note that, in FIG. 1, a medium ME is indicated by a one-dot chain line.

It should be noted that for convenience of explanation, the vertical direction in the installation state (state shown in FIG. 1) in which the image forming apparatus 100 can be used is defined as the up-down direction D1. In addition, a front-rear direction D2 is defined with the front side of the paper as the front surface of the image forming apparatus 100 shown in FIG. 1. Moreover, the left-right direction D3 is defined with reference to the front surface of the image forming apparatus 100 in the installed state.

The image forming apparatus 100 is an inkjet printer capable of forming an image based on image data on a strip-shaped medium ME (see FIG. 1) according to an inkjet method. For example, in the image forming apparatus 100, an image is formed using water-based pigment ink including pigment and water.

For example, the medium ME is airtight. For example, the medium ME is a plastic film. Note that the medium ME does not have to be airtight. For example, the medium ME may be paper, cloth, or the like.

Figure 2:
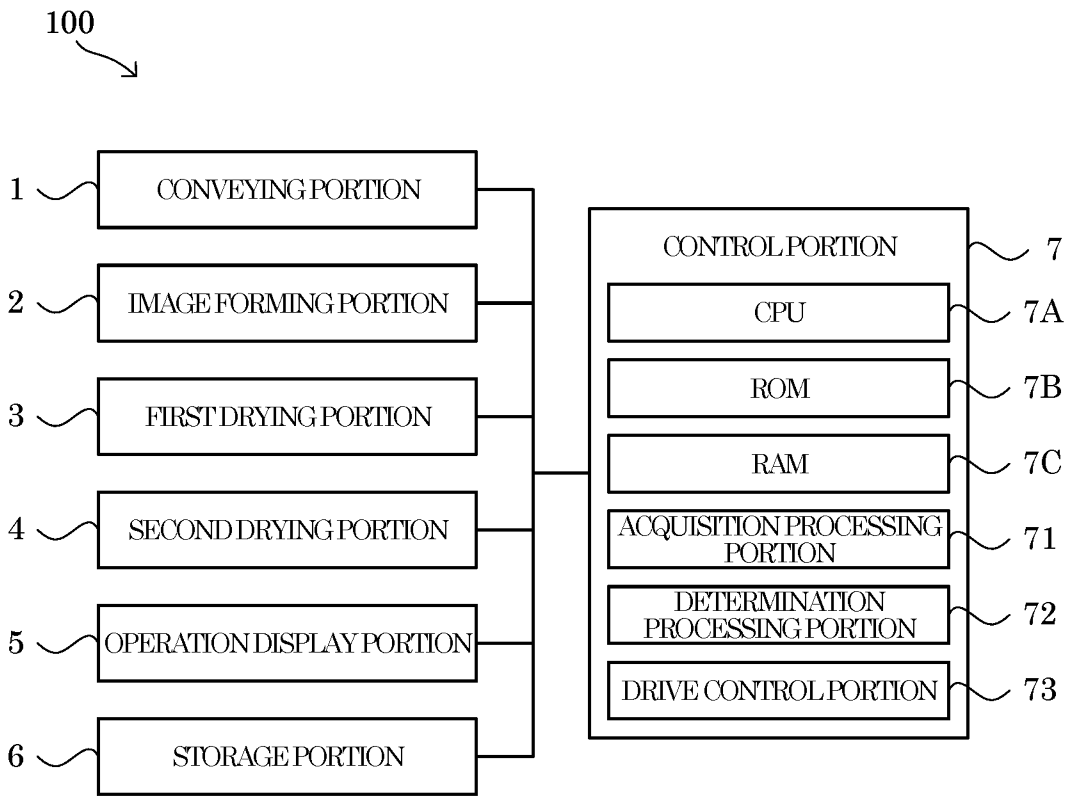
FIG. 2 is a block diagram showing a system configuration of the image forming apparatus of an embodiment according to the present disclosure.
Figure 3:
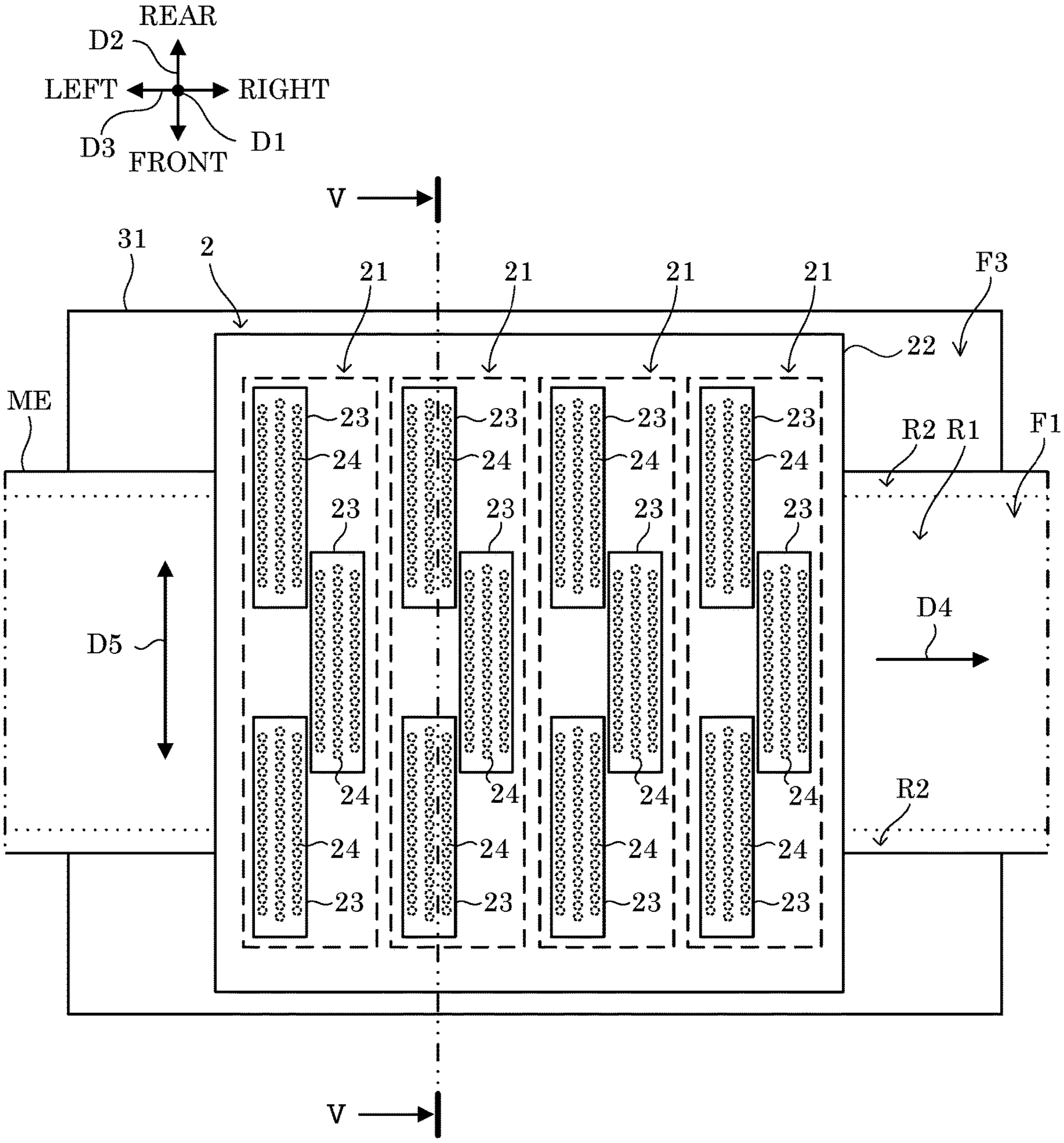
FIG. 3 is a diagram showing a configuration of an image forming portion of the image forming apparatus of an embodiment according to the present disclosure.

As shown in FIG. 1 and FIG. 2, the image forming apparatus 100 includes a conveying portion 1, an image forming portion 2, a first drying portion 3, a second drying portion 4, an operation display portion 5, a storage portion 6, and a control portion 7.

The conveying portion 1 conveys the medium ME (see FIG. 1).

As shown in FIG. 1, the conveying portion 1 includes a take-up roller 11, a delivery roller 12 and a plurality of conveying rollers 13.

A roll-shaped medium ME is attached to the delivery roller 12 so as to be capable of being pulled out. The take-up roller 11 pulls out the medium ME from the delivery roller 12 and takes up the pulled out medium ME. The delivery roller 12 delivers the medium ME along a take-up direction D4 (see FIG. 1) of the medium ME by the take-up roller 11. A plurality of conveying rollers 13 are provided side by side along the predetermined conveying path of the medium ME from the delivery roller 12 to the take-up roller 11. Each of the conveying rollers 13 conveys the medium ME along the take-up direction D4. The take-up roller 11 is an example of a take-up portion according to the present disclosure. In addition, the delivery roller 12 is an example of a supply source of the medium according to the present disclosure.

The image forming portion 2 forms an ink image on a first surface F1 (see FIG. 1) of the medium ME pulled out from the delivery roller 12 by the take-up roller 11.

As shown in FIG. 1 and FIG. 3, the image forming portion 2 has four line heads 21 and a head frame 22.

As shown in FIG. 1, four line heads 21 are provided side by side along the conveying path of the medium ME. For example, the medium ME is guided along a horizontal plane by a first guide plate 31 (see FIG. 1) of the first drying portion 3 provided on the conveying path of the medium ME. The four line heads 21 are provided at an upper side of the medium ME being guided along the horizontal plane so as to face the medium ME. A first surface F1 of the medium ME is a surface of the medium ME facing each of the line heads 21. The head frame 22 holds the four line heads 21.

Each line head 21 forms an ink image on the first surface F1 by ejecting ink droplets toward the first surface F1 of the medium ME pulled out from the delivery roller 12 by the take-up roller 11. The four line heads 21 eject ink droplets of different colors. More specifically, each line head 21 ejects ink droplets of any one of the colors of cyan, magenta, yellow, and black. The line heads 21 are an example of an ejection portion according to the present disclosure.

As shown in FIG. 3, each line head 21 includes three recording heads 23. In each line head 21, three recording heads 23 are arranged in a zigzag pattern along a width direction D5 (see FIG. 3) perpendicular to the take-up direction D4. Note that each line head 21 may have four or more recording heads 23.

Each of the recording heads 23 has an ink ejection surface facing the first surface F1 of the medium ME. A plurality of nozzles 24 (see FIG. 3) are formed on the ink ejection surface. A plurality of rows of nozzles 24 are formed along the take-up direction D4. Each of the nozzles 24 has an ink ejection port for ejecting ink droplets onto the first surface F1 of the medium ME.

Each of the line heads 21 controls whether or not to eject ink from each of the nozzles 24 and controls ejection timing according to control signals transmitted from the control portion 7. Thus, a color image is formed on the first surface F1 of the medium ME using four colors of ink, cyan, magenta, yellow, and black.

The first drying portion 3 heats the medium ME at a position facing the four line heads 21 with the medium ME therebetween, and dries the ink ejected onto the first surface F1 of the medium ME (see FIG. 1).

The second drying portion 4 heats the medium ME farther on the downstream side in the take-up direction D4 than the four line heads 21 to dry the ink ejected onto the first surface F1 of the medium ME (see FIG. 1).

The operation display portion 5 is a user interface of the image forming apparatus 100. The operation display portion 5 includes a display portion and an operation portion. The display portion displays various types of information according to control instructions from the control portion 7. For example, the display portion is a liquid crystal display. The operation portion inputs various types of information to the control portion 7 according to user operations. For example, the operation portion is a touch panel.

The storage portion 6 is a nonvolatile storage device. For example, the storage portion 6 is flash memory. Note that the storage portion 6 may be a solid state drive (SSD) or a hard disk drive (HDD).

The control portion 7 performs overall control of the image forming apparatus 100. Note that the control portion 7 may be a control portion provided separately from the main control portion that performs overall control of the image forming apparatus 100.

As shown in FIG. 2, the control portion 7 includes a CPU 7A, a ROM 7B, and a RAM 7C. The CPU 7A is a processor that executes various types of arithmetic processes. The ROM 7B is a non-volatile storage device in which information such as control programs for causing the CPU 7A to execute various types of processes is stored in advance. The RAM 7C is a volatile or non-volatile storage device used as a temporary storage memory (work area) for various types of processes executed by the CPU 7A. The CPU 7A performs overall control of the image forming apparatus 100 by executing various types of control programs stored in advance in the ROM 7B. Note that the control portion 7 may be configured by an electronic circuit such as an integrated circuit (ASIC).

[Configuration of the First Drying Portion 3]

Figure 4:
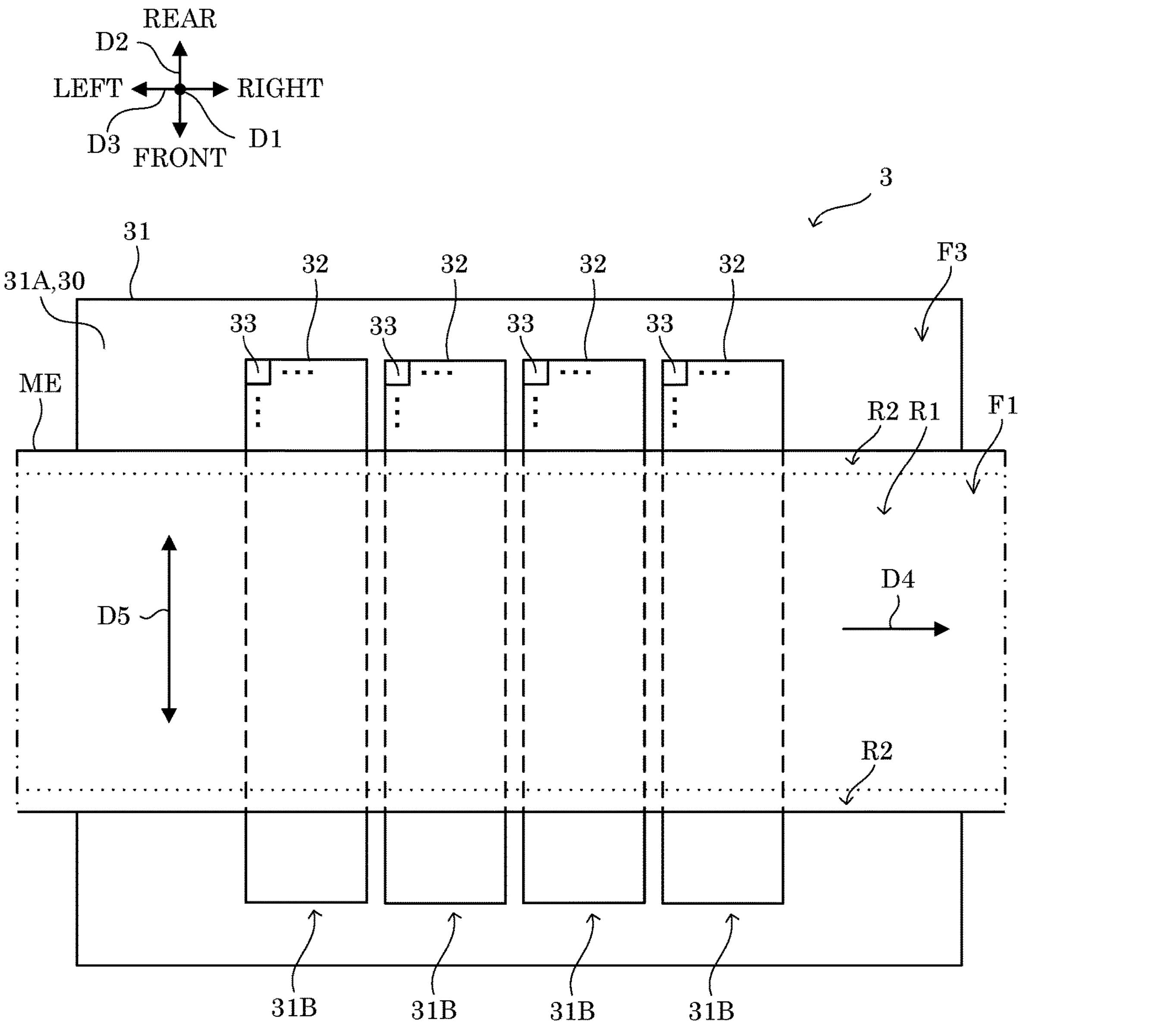
FIG. 4 is a diagram showing a configuration of a first drying portion of the image forming apparatus of an embodiment according to the present disclosure.
Figure 5:
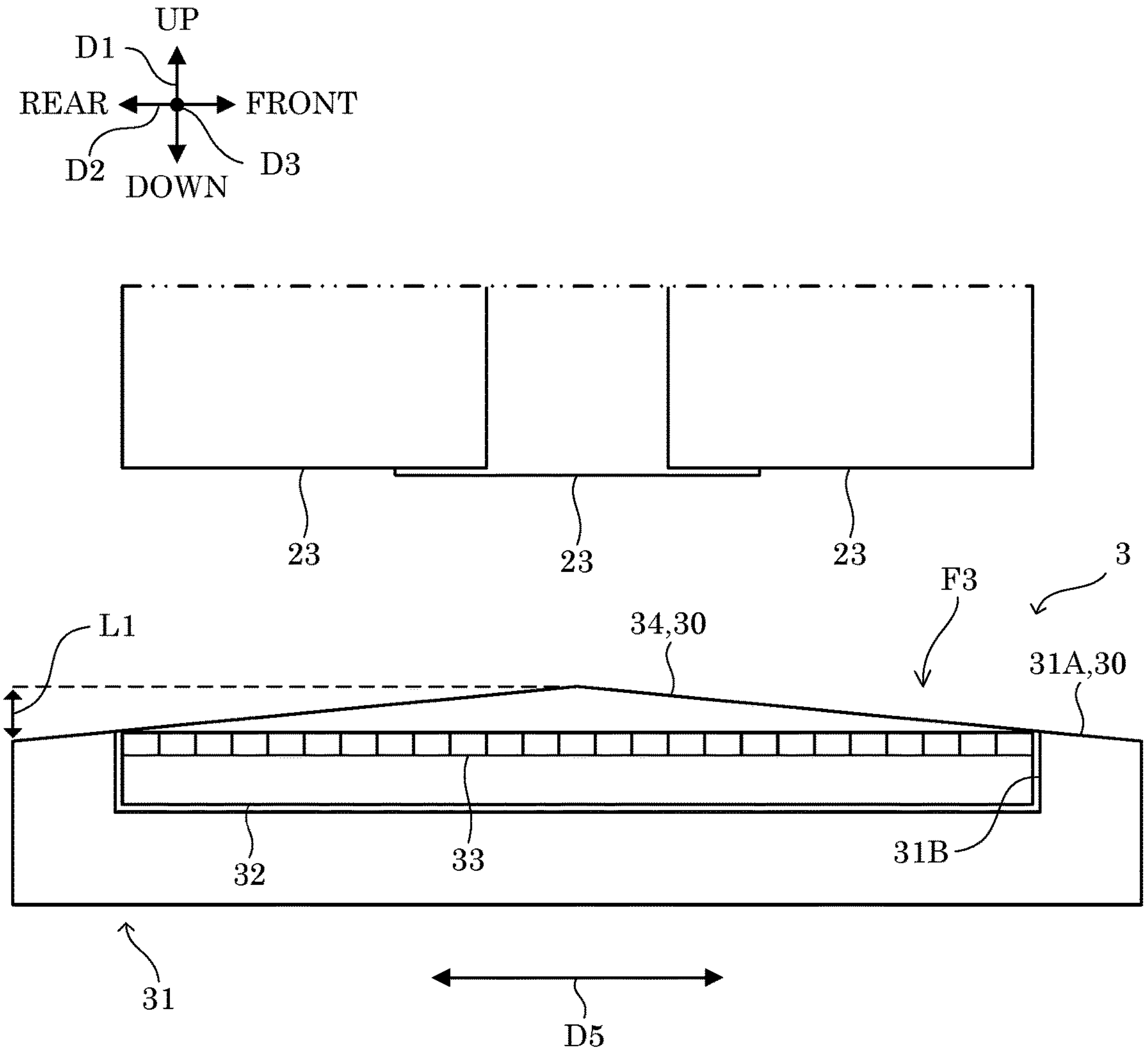
FIG. 5 is a diagram showing a configuration of the first drying portion of the image forming apparatus of an embodiment according to the present disclosure.

Next, a configuration of the first drying portion 3 will be described with reference to FIG. 1, FIG. 4, and FIG. 5. Here, FIG. 4 is a view of the first drying portion 3 as seen from above the first drying portion 3. In addition, FIG. 5 is a cross-sectional view taken along line V-V in FIG. 3. Note that the medium ME is omitted in FIG. 5.

As shown in FIG. 1, the first drying portion 3 includes a first guide plate 31 and four first heating portions 32.

The first guide plate 31 is provided at a position that sandwiches the medium ME between the first guide plate 31 and the four line heads 21. The first guide plate 31 is a flat member arranged along a horizontal plane. For example, the first guide plate 31 is formed of a metal such as stainless steel or the like. A first upper surface portion 31A (see FIG. 4) that forms an upper surface of the first guide plate 31 faces a second surface F2 (see FIG. 1) of the medium ME. The second surface F2 of the medium ME is a rear surface of the first surface F1 of the medium ME. A downwardly recessed first recessed portion 31B (see FIG. 4 and FIG. 5) is formed in the first upper surface portion 31A in each of the opposing regions facing the line heads 21.

As shown in FIG. 1, the four first heating portions 32 correspond to the four line heads 21. More specifically, each of the first heating portions 32 is provided in a corresponding first recessed portion 31B (see FIG. 4) below a corresponding line head 21. Each of the first heating portions 32 is formed in a flat plate shape. Each of the first heating portions 32 is a so-called thermal head. Each of the first recessed portions 31B is formed into a shape that allows the first heating portion 32 to be fitted therein.

A plurality of first heating elements 33 (see FIG. 4) are arranged along the width direction D5 at an upper portion of the first heating portion 32. More specifically, at the upper portion of the first heating portion 32, rows of the first heating elements 33 along the width direction D5 are arranged side-by-side along the take-up direction D4. For example, a plurality of first heating elements 33 are arranged in a grid pattern at the upper portion of the first heating portion 32. Note that the plurality of first heating elements 33 may be arranged at a predetermined density in a manner different from the grid pattern.

Each of the first heating elements 33 generates heat according to a power supply. For example, each of the first heating elements 33 includes a resistance heating element. The plurality of first heating elements 33 are selectively driven by a first driving circuit (not shown) provided in the first heating portion 32. In other words, the first heating portion 32 can cause one or a plurality of arbitrarily selected first heating elements 33 among the plurality of first heating elements 33 to generate heat. The medium ME is heated by the one or more first heating elements 33 generating heat.

For example, the control portion 7 controls driving of the first heating elements 33 using a first temperature sensor (not shown) capable of detecting surface temperature of the first heating portion 32. For example, the control portion 7 controls driving of the first heating elements 33 so that the temperature detected by the first temperature sensor does not exceed a predetermined first temperature. For example, the first temperature is 60 degrees.

An upper portion of the first heating portion 32 is covered with a first protective layer 34 (see FIG. 5). That is, the first protective layer 34 is provided above the plurality of first heating elements 33. For example, the first protective layer 34 is formed of hard glass. Note that the first protective layer 34 may be formed of a resin such as polyimide.

The first protective layer 34 and the first upper surface portion 31A constitute a first guide portion 30 (see FIG. 5). The first guide portion 30 forms a first guide surface F3 (see FIG. 4 and FIG. 5) that comes in contact with the second surface F2 of the medium ME and guides the medium ME. More specifically, the first protective layer 34 is formed so as to be substantially flush with the first upper surface portion 31A. The first guide surface F3 applies tension to the medium ME by pressing the medium ME from below. Thus, the medium ME is guided in the take-up direction D4 along the horizontal plane.

Here, a central portion in the width direction D5 of the first guide surface F3 bulges toward the medium ME side. That is, the first upper surface portion 31A is formed such that the central portion in the width direction D5 bulges toward the medium ME side. In addition, the four first recessed portions 31B are formed after the bulging first upper surface portion 31A is formed. Moreover, the first protective layer 34 of the first heating portion 32 is formed such that the central portion in the width direction D5 bulges toward the medium ME side.

Thus, a pulling force is generated in the medium ME in contact with the first guide surface F3 from the end portions in the width direction D5 toward the central portion. Therefore, the occurrence of wrinkles in the medium ME is suppressed.

For example, as shown in FIG. 5, the first guide surface F3 is formed to have a pair of inclined planes that are inclined downward from the central portion to the end portions in the width direction D5. Note that the first guide surface F3 may be formed to have a pair of inclined planes or a pair of inclined curved surfaces that are inclined downward from the central portion toward the end portion sides in the width direction D5.

In addition, the first guide plate 31 is arranged so that the distance between the bulging top portion of the first guide surface F3 and the line head 21 is a predetermined reference distance.

Moreover, of the first guide surface F3, the central portion in the width direction D5 bulges a first bulging distance L1 (see FIG. 5) that is equal to or greater than a predetermined lower limit value and equal to or less than a predetermined first upper limit value.

Here, the lower limit value is a value corresponding to the type of medium ME. For example, in a case where the type of the medium ME used in the image forming apparatus 100 is unchanged, the lower limit value can be set based on the results of an experiment in which the bulging distance of the first guide surface F3 is increased in stages and the presence or absence of a wrinkle smoothing effect of the medium ME by the first guide surface F3 at each stage is evaluated. In addition, in a case where the type of medium ME used in the image forming apparatus 100 is changed, the lower limit value can be set based on the results of the experiment for each type of medium ME used in the image forming apparatus 100. That is, the minimum value of the bulging distance of the first guide surface F3 at which the wrinkle smoothing effect of the medium ME can be recognized for all types of media may be set as the lower limit value.

In addition, the first upper limit value is a value corresponding to the ink ejection speed of the line head 21. For example, the first upper limit value may be set based on the results of an experiment in which the bulging distance of the first guide surface F3 is increased stepwise, and the presence or absence of defects in the ink image formed at the end portions of the medium ME in the width direction D5 by the line head 21 at each step is evaluated.

For example, in the image forming apparatus 100, the lower limit value is 50 μm (micrometers). In addition, in the image forming apparatus 100, the first upper limit value is 200 μm (micrometers).

By setting the bulging amount of the central portion of the first guide surface F3 in the width direction D5 to be equal to or greater than the lower limit value, it is possible to obtain a wrinkle smoothing effect of the medium ME. Further, by setting the bulging amount of the central portion of the first guide surface F3 in the width direction D5 to be equal to or less than the first upper limit value, it is possible to suppress the occurrence of problems such as bleeding in the ink image formed at the end portions of the medium ME in the width direction D5.

Note that the first guide surface F3 may be a flat surface of which the central portion in the width direction D5 does not bulge toward the medium ME. In this case, the first guide plate 31 may be arranged such that the distance between the first guide surface F3 and the line head 21 is the reference distance.

[Configuration of the Second Drying Portion 4]

Figure 6:
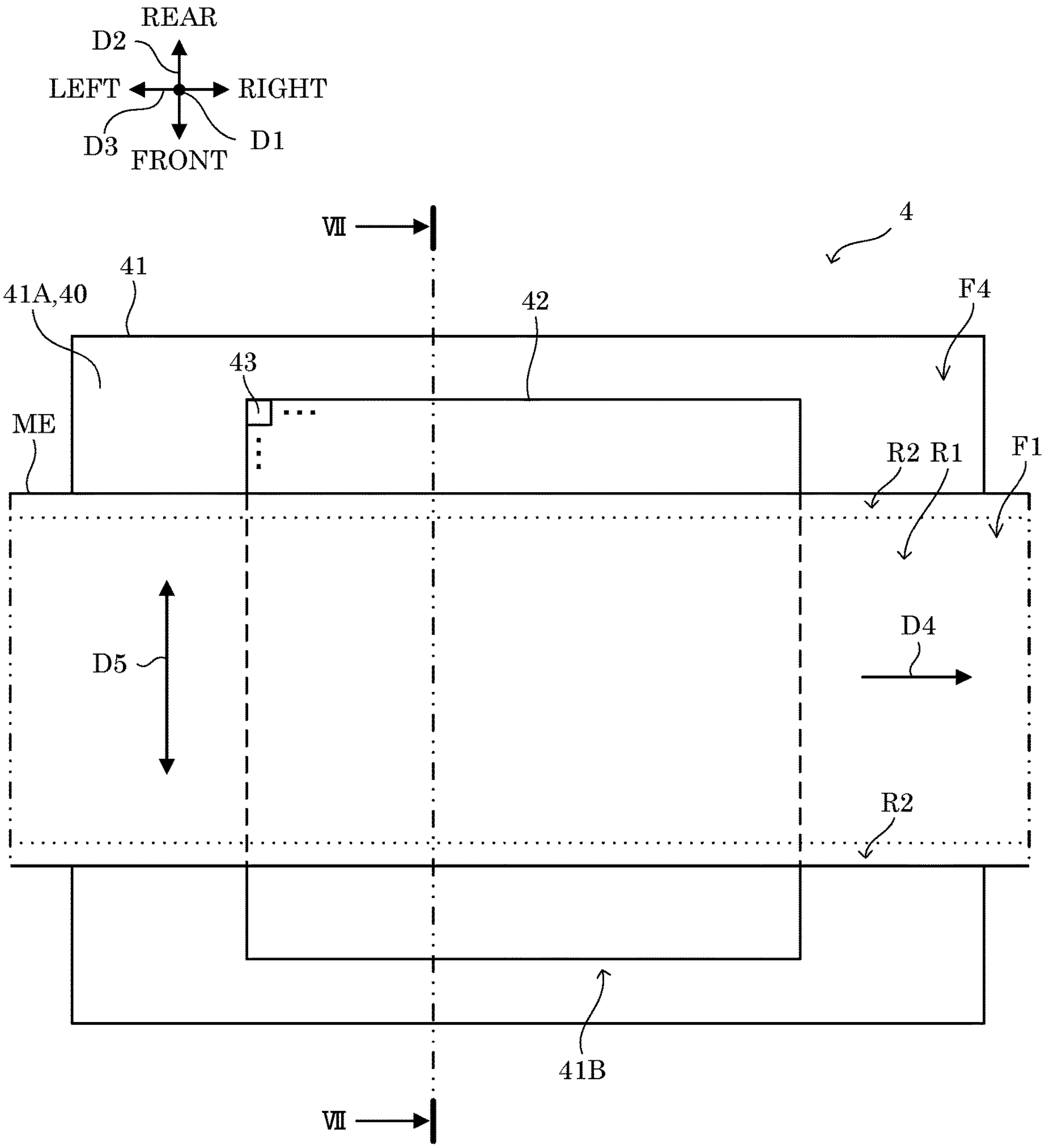
FIG. 6 is a diagram showing a configuration of a second drying portion of the image forming apparatus of an embodiment according to the present disclosure.
Figure 7:
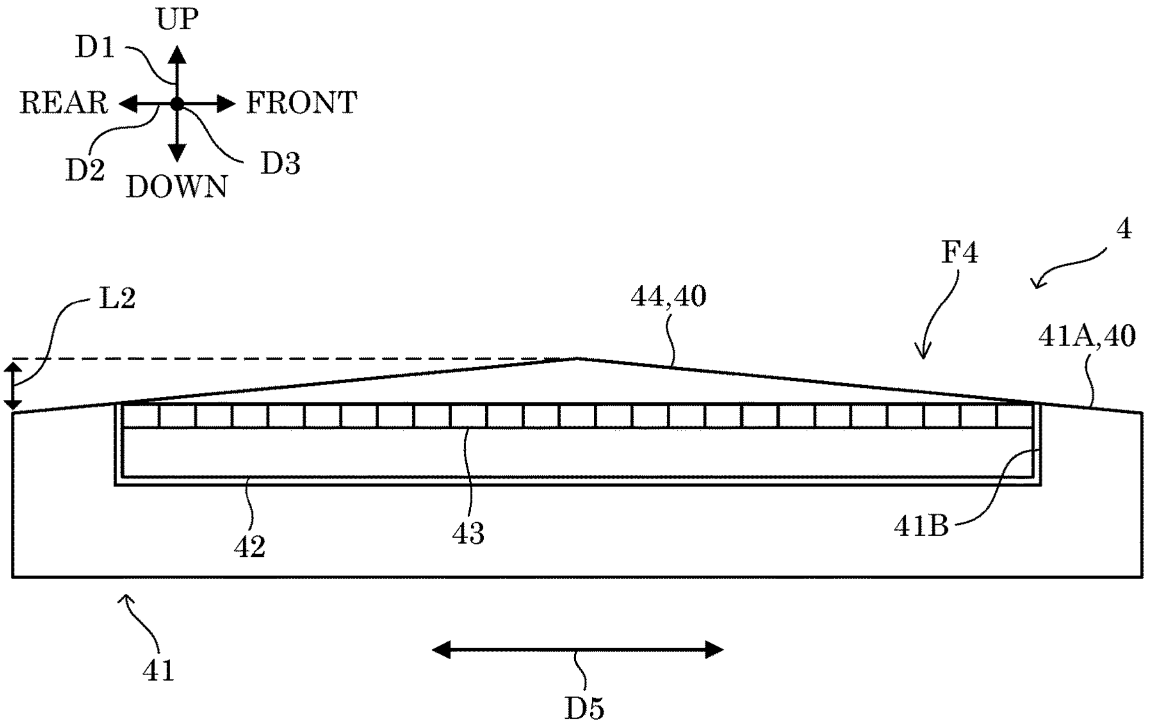
FIG. 7 is a diagram showing a configuration of the second drying portion of the image forming apparatus of an embodiment according to the present disclosure.

Next, a configuration of the second drying portion 4 will be described with reference to FIG. 1, FIG. 6, and FIG. 7. Here, FIG. 6 is a view of the second drying portion 4 as seen from above the second drying portion 4. In addition, FIG. 7 is a cross-sectional view in the direction of arrows VII-VII in FIG. 6. Note that the medium ME is omitted in FIG. 7.

As shown in FIG. 1, the second drying portion 4 includes a second guide plate 41 and a second heating portion 42.

The second guide plate 41 is provided farther on the downstream side in the take-up direction D4 than the four line heads 21. The second guide plate 41 is a flat plate-shaped member arranged along the horizontal plane. For example, the second guide plate 41 is made of a metal such as stainless steel or the like. A second upper surface portion 41A (see FIG. 6) forming an upper surface of the second guide plate 41 faces the second surface F2 (see FIG. 1) of the medium ME. A second recessed portion 41B that is recessed downward (see FIG. 6 and FIG. 7) is formed in the second upper surface portion 41A.

The second heating portion 42 is provided in the second recessed portion 41B (see FIG. 6). The second heating portion 42 is formed in a flat plate shape. The second heating portion 42 is a so-called thermal head. The size of the second heating portion 42 in the width direction D5 is the same as that of the first heating portion 32. The size of the second heating portion 42 in the take-up direction D4 is larger than that of the first heating portion 32. The second recessed portion 41B is formed into a shape that allows the second heating portion 42 to be fitted therein.

A plurality of second heating elements 43 (see FIG. 6) are arranged along the width direction D5 on an upper portion of the second heating portion 42. More specifically, at the upper portion of the second heating portion 42, rows of the second heating elements 43 along the width direction D5 are arranged side-by-side along the take-up direction D4. For example, a plurality of second heating elements 43 are arranged in a grid pattern at the upper portion of the second heating portion 42. Note that the plurality of second heating elements 43 may be arranged at a predetermined density in a manner different from the grid pattern.

The second heating element 43 has the same configuration as the first heating element 33. The plurality of second heating elements 43 are selectively driven by a second driving circuit (not shown) provided in the second heating portion 42. In other words, the second heating portion 42 can cause one or a plurality of arbitrarily selected second heating elements 43 among the plurality of second heating elements 43 to generate heat. The medium ME is heated by the one or more second heating elements 43 generating heat.

For example, the control portion 7 controls driving of the second heating elements 43 using a second temperature sensor (not shown) capable of detecting surface temperature of the second heating portion 42. For example, the control portion 7 controls driving of the second heating elements 43 so that the temperature detected by the second temperature sensor does not exceed a predetermined second temperature that is higher than the first temperature. For example, the second temperature is 130 degrees.

An upper portion of the second heating portion 42 is covered with a second protective layer 44 (see FIG. 7). That is, the second protective layer 44 is provided above the plurality of second heating elements 43. The second protective layer 44 has the same configuration as the first protective layer 34.

The second protective layer 44 and the second upper surface portion 41A constitute a second guide portion 40 (see FIG. 7). The second guide portion 40 forms a second guide surface F4 (see FIG. 6 and FIG. 7) that guides the medium ME by coming in contact with the second surface F2 of the medium ME. More specifically, the second protective layer 44 is formed so as to be substantially flush with the second upper surface portion 41A. The second guide surface F4 applies tension to the medium ME by pressing the medium ME from below. Thus, the medium ME is guided in the take-up direction D4 along the horizontal plane.

Here, a central portion in the width direction D5 of the second guide surface F4 bulges toward the medium ME side. That is, the second upper surface portion 41A is formed such that the central portion in the width direction D5 bulges toward the medium ME side. In addition, the second recessed portion 41B is formed after the bulging second upper surface portion 41A is formed. Moreover, the second protective layer 44 of the second heating portion 42 is formed such that the central portion in the width direction D5 bulges toward the medium ME side.

Thus, a pulling force is generated in the medium ME in contact with the second guide surface F4 from the end portions in the width direction D5 toward the central portion. Therefore, the occurrence of wrinkles in the medium ME is suppressed.

For example, as shown in FIG. 7, the second guide surface F4 is formed to have a pair of inclined planes that are inclined downward from the central portion to the end portions in the width direction D5. Note that the second guide surface F4 may be formed to have a pair of inclined planes or a pair of inclined curved surfaces that are inclined downward from the central portion toward the end portion sides in the width direction D5.

In addition, the central portion in the width direction D5 of the second guide surface F4 bulges by a second bulging distance L2 (see FIG. 7) within a predetermined numerical range corresponding to the type of medium ME.

Here, the numerical range is defined by the lower limit value and a predetermined second upper limit value. The second upper limit value is a value corresponding to the type of medium ME. For example, in a case where the type of the medium ME used in the image forming apparatus 100 is unchanged, the second upper limit value can be set based on the results of an experiment in which the bulging distance of the second guide surface F4 is increased in stages and the presence or absence of deformation of the medium ME at each stage is evaluated. In addition, in a case where the type of medium ME used in the image forming apparatus 100 is changed, the second upper limit value can be set based on the results of the experiment for each type of medium ME used in the image forming apparatus 100. That is, the maximum value of the bulging distance of the second guide surface F4 at which deformation of the medium ME is not recognized in all types may be set as the second upper limit value.

For example, in the image forming apparatus 100, the second upper limit value is 2 mm (millimeters).

By setting the bulging amount of the central portion in the width direction D5 of the second guide surface F4 to be equal to or less than the second upper limit value, it is possible to suppress the occurrence of deformation in the medium ME such as elongation in the width direction D5 or formation of a crease along the central portion in the width direction D5.

Note that the second guide surface F4 may be a flat surface whose central portion in the width direction D5 does not bulge toward the medium ME.

An image forming apparatus that, of the plurality of first heating elements 33, selectively drives the first heating elements 33 facing the ink adhesion area of the medium ME is known as a related art.

However, in the image forming apparatus according to the related technology described above, since the areas on both sides of the adhesion area in the width direction D5 are not heated, the amount of thermal expansion of the medium ME along the take-up direction D4 differs for each position in the width direction D5 on the medium ME. Therefore, in the image forming apparatus, distortion may occur in the image formed on the medium ME.

On the other hand, in the image forming apparatus 100 of an embodiment according to the present disclosure, it is possible to suppress the distortion of the formed image as described below.

[Configuration of the Control Portion 7]

Next, a configuration of the control portion 7 will be described with reference to FIG. 2.

As shown in FIG. 2, the control portion 7 includes an acquisition processing portion 71, a determination processing portion 72, and a drive control portion 73.

More specifically, the ROM 7B of the control portion 7 stores in advance a heating control program for causing the CPU 7A of the control portion 7 to execute a heating control process (see the flowchart of FIG. 8), which will be described later. Note that the heating control program is recorded on a computer-readable recording medium such as a CD, DVD, flash memory, or the like, and may be read from the recording medium and installed in a storage device such as the storage portion 6.

The control portion 7, using the CPU 7A, functions as the acquisition processing portion 71, the determination processing portion 72, and the drive control portion 73 by executing the heating control program stored in the ROM 7B.

Note that some or all of the functional portions included in the control portion 7 may be configured by electronic circuits. In addition, the heating control program may be a program for causing a plurality of processors to function as functional portions included in the control portion 7.

The acquisition processing portion 71 acquires a size of the medium ME in the width direction D5 and a size of an image forming area R1 (see FIG. 3) on the medium ME.

Here, the image forming area R1 is an area inside margin areas R2 (see FIG. 3) set at both end portions of the medium ME in the width direction D5, and is an area where an ink image is formed. Note that in FIG. 3, FIG. 4, and FIG. 6, the boundary lines between the image forming area R1 and the margin areas R2 are indicated by dotted lines.

For example, the acquisition processing portion 71 acquires the size of the medium ME in the width direction D5 and the size of the image forming area R1 on the medium ME based on setting information input by a user operation on the operation display portion 5.

The determination processing portion 72 determines the first heating elements 33 and the second heating elements 43 to be driven based on the width of the medium ME.

For example, the determination processing portion 72 determines the first heating elements 33 and the second heating elements 43 to be driven based on the width of the medium ME and the image forming area R1 on the medium ME.

For example, the determination processing portion 72 determines the first heating elements 33 that partially or entirely face the image forming area R1 and that entirely face the medium ME as the first heating elements 33 to be driven. Thus, in a case where the margin area R2 is narrow, it is possible to set the heating area in the first heating portion 32 based on the image forming area R1 and prevent the heating area from protruding outside the medium ME. Note that in a case where the heating area in the first heating portion 32 is set based on the image forming area R1, a difference occurs in the amount of thermal expansion of the medium ME along the take-up direction D4 between the image forming area R1 and the margin area R2. However, ink is not ejected in the margin area R2, and thus the formed image is not distorted.

In addition, the determination processing portion 72 determines the second heating elements 43 that are partially or entirely facing the image forming area R1 and entirely facing the medium ME as the second heating elements 43 to be driven.

Note that the determination processing portion 72 may determine the first heating elements 33 and the second heating elements 43 to be driven based on the image forming area R1 on the medium ME. For example, the determination processing portion 72 may determine the first heating elements 33 that are partially or entirely facing the image forming area R1 as the first heating elements 33 to be driven. In addition, the determination processing portion 72 may determine the first heating elements 33 that are entirely facing the image forming area R1 as the first heating elements 33 to be driven.

Moreover, the determination processing portion 72 may determine the first heating elements 33 and the second heating elements 43 to be driven based on the width of the medium ME. For example, the determination processing portion 72 may determine the first heating elements 33 that are entirely facing the medium ME as the first heating elements 33 to be driven. In addition, the determination processing portion 72 may determine the first heating elements 33 that are partially or entirely facing the medium ME as the first heating elements 33 to be driven.

The drive control portion 73 drives the first heating elements 33 and the second heating elements 43 determined by the determination processing portion 72 to be driven.

[Heating Control Process]

Figure 8:
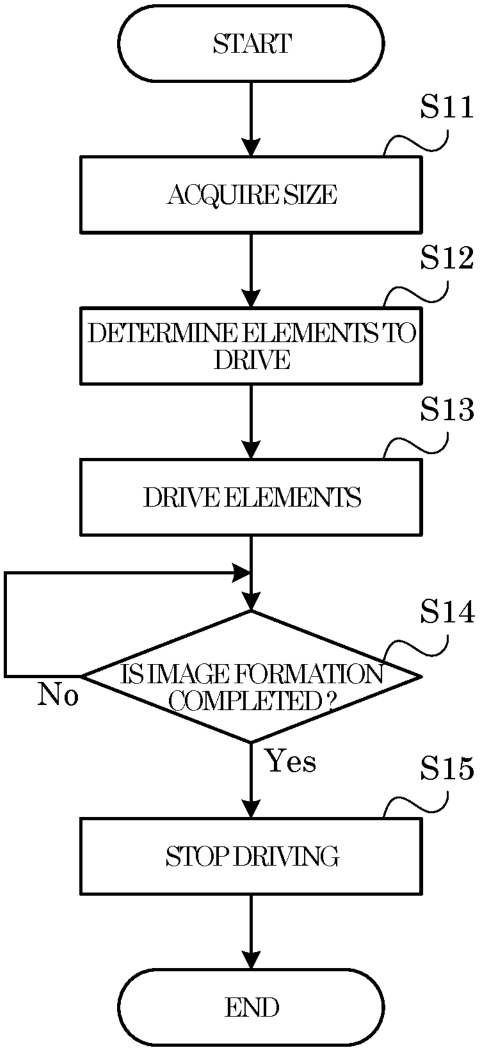
FIG. 8 is a flowchart showing an example of a heat generation control process executed by the image forming apparatus of an embodiment according to the present disclosure.

The heating control method according to the present disclosure, together with an example of a procedure of the heating control process executed by the control portion 7 in the image forming apparatus 100, will be described below with reference to FIG. 8. Here, steps S11, S12, . . . represent the numbers of the processing procedures (steps) executed by the control portion 7. Note that in a case where an image forming process for forming an ink image on the medium ME based on image data is executed, the heating control process is executed together with the image forming process.

<Step S11>

First, in step S11, the control portion 7 acquires the size of the medium ME in the width direction D5 and the size of the image forming area R1 (see FIG. 3) on the medium ME. Here, the processing of step S11 is executed by the acquisition processing portion 71 of the control portion 7.

More specifically, the control portion 7 acquires the size of the medium ME in the width direction D5 and the size of the image forming area R1 on the medium ME based on the setting information input by a user operation on the operation display portion 5.

<Step S12>

In step S12, control portion 7 determines the first heating elements 33 and the second heating elements 43 to be driven based on the information acquired in the processing of step S11. Here, the processing of step S12 is executed by the determination processing portion 72 of the control portion 7. The processing of step S12 is an example of a determination step according to the present disclosure.

More specifically, the control portion 7 determines the first heating elements 33 that are partially or entirely facing the image forming area R1 and entirely facing the medium ME as the first heating elements 33 to be driven. In addition, the control portion 7 determines the second heating elements 43 that are partially or entirely facing the image forming area R1 and entirely facing the medium ME as the second heating elements 43 to be driven.

<Step S13>

In step S13, the control portion 7 drives the first heating elements 33 and the second heating elements 43 determined by the processing of step S12 as heating elements to be driven. Here, the processing of step S13 is executed by the drive control portion 73 of the control portion 7. The processing of step S13 is an example of a drive control step according to the present disclosure.

<Step S14>

In step S14, the control portion 7 determines whether or not the image forming process has ended.

Here, when the control portion 7 determines that the image forming process has ended (YES in S14), the process proceeds to step S15. In addition, when the control portion 7 determines that the image forming process has not ended (NO in S14), the control portion 7 waits for the end of the image forming process in step S14.

<Step S15>

In step S15, the control portion 7 stops driving the first heating elements 33 and the second heating elements 43 determined as heating elements to be driven.

In this way, in the image forming apparatus 100, the first heating elements 33 and the second heating elements 43 to be driven are determined based on the width of the medium ME. Thus, it is possible to avoid the occurrence of a difference in the amount of thermal expansion of the medium ME along the take-up direction D4 for each position in the width direction D5 of the medium ME. Therefore, it is possible to suppress the occurrence of distortion of the formed image.

Here, in the image forming apparatus 100, the heating areas of the first heating portion 32 and the second heating portion 42 are wider than those of the image forming apparatus according to the above related technology. Thus, the area of the medium ME that is thermally expanded is widened, and wrinkles are likely to occur in the medium ME.

On the other hand, in the image forming apparatus 100, the central portion in the width direction D5 of the first guide surface F3 bulges toward the medium ME side. In addition, in the image forming apparatus 100, the central portion in the width direction D5 of the second guide surface F4 bulges toward the medium ME side. Thus, it is possible to suppress the occurrence of wrinkles on the medium ME passing through the first drying portion 3 and the second drying portion 4.

[Supplementary Notes of Disclosure]

A summary of the disclosure extracted from the above-described embodiments will be added below. Note that each configuration and each processing function described in the supplementary notes below may be selected and combined arbitrarily.

<Supplementary Note 1>

An image forming apparatus including:

a take-up portion configured to take up a strip-shaped medium;

an ejection portion configured to eject ink toward a first surface of the medium pulled out from a supply source of the medium by the take-up portion;

a guide portion provided at a position sandwiching the medium between the guide portion and the ejection portion, the guide portion configured to form a guide surface that guides the medium by coming into contact with a second surface of the medium on a rear side of the first surface;

a plurality of heating elements arranged along a width direction of the medium below the guide surface;

a determination processing portion configured to determine the heating elements to be driven based on the width of the medium; and a drive control portion configured to drive the heating elements determined by the determination processing portion as heating elements to be driven.

<Supplementary Note 2>

The image forming apparatus according to Supplementary Note 1, wherein the determination processing portion determines the heating elements to be driven based on the width of the medium and an image forming area on the medium.

<Supplementary Note 3>

The image forming apparatus according to Supplementary Note 1 or Supplementary Note 2, wherein a central portion in the width direction of the guide surface bulges toward the medium.

<Supplementary Note 4>

The image forming apparatus according to Supplementary Note 3, wherein the central portion in the width direction of the guide surface bulges by a distance equal to or greater than a lower limit value corresponding to a type of the medium.

<Supplementary Note 5>

The image forming apparatus according to Supplementary Note 3 or Supplementary Note 4, wherein the central portion in the width direction of the guide surface bulges by a distance equal to or less than an upper limit value corresponding to an ink ejection speed of the ejection portion.

<Supplementary Note 6>

The image forming apparatus according to any one of Supplementary Notes 1 to 5, wherein the medium is a plastic film.

<Supplementary Note 7>

A heating control method executed by an image forming apparatus comprising: a take-up portion configured to take up a strip-shaped medium; an ejection portion configured to eject ink toward a first surface of the medium pulled out from a supply source of the medium by the take-up portion; a guide portion provided at a position sandwiching the medium between the guide portion and the ejection portion, the guide portion configured to form a guide surface that guides the medium by coming into contact with a second surface of the medium on a rear side of the first surface; and a plurality of heating elements arranged along a width direction of the medium below the guide surface;

the heating control method comprising:

a determination step of determining the heating elements to be driven based on a width of the medium; and a drive control step of driving the heating elements determined by the determination step as heating elements to be driven.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:

a take-up portion configured to take up a strip-shaped medium;

an ejection portion configured to eject ink toward a first surface of the medium pulled out from a supply source of the medium by the take-up portion;

a guide portion provided at a position sandwiching the medium between the guide portion and the ejection portion, the guide portion configured to form a guide surface that guides the medium by coming into contact with a second surface of the medium on a rear side of the first surface;

a plurality of heating elements arranged along a width direction of the medium below the guide surface;

a determination processing portion configured to determine heating elements to be driven based on a width of the medium; and a drive control portion configured to drive the heating elements determined by the determination processing portion as heating elements to be driven, wherein a central portion in the width direction of the guide surface bulges toward the medium by a distance equal to or greater than a lower limit value corresponding to a type of the medium.

2. The image forming apparatus according to claim 1, wherein the determination processing portion determines the heating elements to be driven based on the width of the medium and an image forming area on the medium.

3. The image forming apparatus according to claim 1, wherein the distance is equal to or less than an upper limit value corresponding to an ink ejection speed of the ejection portion.

4. The image forming apparatus according to claim 1, wherein the medium is a plastic film.

5. A heating control method executed by an image forming apparatus that includes a take-up portion configured to take up a strip-shaped medium; an ejection portion configured to eject ink toward a first surface of the medium pulled out from a supply source of the medium by the take-up portion; a guide portion provided at a position sandwiching the medium between the guide portion and the ejection portion, the guide portion configured to form a guide surface that guides the medium by coming into contact with a second surface of the medium on a rear side of the first surface; and a plurality of heating elements arranged along a width direction of the medium below the guide surface;

the heating control method comprising:

a determination step of determining heating elements to be driven based on a width of the medium; and a drive control step of driving the heating elements determined by the determination step as heating elements to be driven, wherein a central portion in the width direction of the guide surface bulges toward the medium by a distance equal to or greater than a lower limit value corresponding to a type of the medium.

6. An image forming apparatus comprising:

a take-up portion configured to take up a strip-shaped medium;

an ejection portion configured to eject ink toward a first surface of the medium pulled out from a supply source of the medium by the take-up portion;

a guide portion provided at a position sandwiching the medium between the guide portion and the ejection portion, the guide portion configured to form a guide surface that guides the medium by coming into contact with a second surface of the medium on a rear side of the first surface;

a plurality of heating elements arranged along a width direction of the medium below the guide surface;

a determination processing portion configured to determine heating elements to be driven based on a width of the medium; and a drive control portion configured to drive the heating elements determined by the determination processing portion as heating elements to be driven, wherein a central portion in the width direction of the guide surface bulges toward the medium by a distance equal to or less than an upper limit value corresponding to an ink ejection speed of the ejection portion.

7. The image forming apparatus according to claim 6, wherein the determination processing portion determines the heating elements to be driven based on the width of the medium and an image forming area on the medium.

8. The image forming apparatus according to claim 6, wherein the medium is a plastic film.

* * * * *